United States Patent [19]

Iyengar et al.

[11] Patent Number: 5,392,417
[45] Date of Patent: Feb. 21, 1995

[54] PROCESSOR CYCLE TRACKING IN A CONTROLLER FOR TWO-WAY SET ASSOCIATIVE CACHE

[75] Inventors: Sundaravarathan R. Iyengar; James Nadir, both of San Jose, Calif.

[73] Assignee: Intel Corporation, Santa Clara, Calif.

[21] Appl. No.: 205,129

[22] Filed: Mar. 1, 1994

Related U.S. Application Data

[63] Continuation of Ser. No. 710,742, Jun. 5, 1991, abandoned.

[51] Int. Cl.[6] .............................................. G06F 12/08
[52] U.S. Cl. ............................ 395/425; 364/DIG. 1; 364/243.41
[58] Field of Search ... 364/200 MS File, 900 MS File; 395/425

[56] References Cited

U.S. PATENT DOCUMENTS

| | | | |
|---|---|---|---|
| 4,197,580 | 4/1980 | Chang et al. | 395/425 |
| 4,774,654 | 9/1988 | Pomerene et al. | 395/425 |
| 4,802,085 | 1/1989 | Levy et al. | 395/375 |
| 4,843,542 | 6/1989 | Dashiell et al. | 395/425 |
| 4,905,141 | 2/1990 | Brenza | 395/425 |
| 4,926,323 | 5/1990 | Baror et al. | 395/375 |
| 5,067,071 | 11/1991 | Schanin et al. | 395/275 |
| 5,129,090 | 7/1992 | Bland et al. | 395/725 |
| 5,155,843 | 10/1992 | Stamm et al. | 395/575 |
| 5,210,845 | 5/1993 | Crawford et al. | 395/425 |
| 5,230,068 | 7/1993 | Van Dyte et al. | 395/375 |

*Primary Examiner*—Reba I. Elmore
*Assistant Examiner*—Matthew M. Kim
*Attorney, Agent, or Firm*—Owen L. Lamb

[57] ABSTRACT

A processor communicates over a memory bus with a main memory and a cache by asserting an address strobe signal (ADS) to initiate a memory access. The cache includes a cache controller and a tag random access memory (tag RAM). Internal cycles are tracked by a first logic in the tag RAM that responds to an external cycle (EXCYC) signal and asserts an internal cycle (INCYC) signal during a time when a request to the tag RAM is pending. A second logic combines the INCYC signal with the. ADS to generate an address strobe wait (ADSWAIT) signal. A third logic combines the AD-SWAIT signal with the ADS to generate an address strobe cycle (ADSCYC) signal. A fourth logic responsive to one of several end-of-cycle signals generates a terminate signal to signify an end of a current cycle. A fifth logic asserts the EXCYC signal in response to the ADSCYC signal and unasserts the EXCYC signal in response to the terminate signal.

2 Claims, 4 Drawing Sheets

FIG. 4  OPERATION OF THE INPUT MUX

FIG. 5  GENERATION OF THE zADSCYC SIGNAL

FIG. 6  SNOOP HIT CYCLE

PROCESSOR CYCLE TRACKING IN A CONTROLLER FOR TWO-WAY SET ASSOCIATIVE CACHE

CROSS-REFERENCE TO RELATED APPLICATION

This application is a continuation of U.S. patent application Ser. No. 07/710,742, filed on Jun. 5, 1991, now abandoned. This application is related to U.S. Pat. No. 5,210,845, of John H. Crawford, et al., entitled "Controller for Two-way Set Associative Cache", granted on May 11, 1993, and to U.S. Pat. No. 5,339,399, of Yong Lee, et al., entitled "Critical Timing Management in a Controller for Two-way Set Associative Cache", granted on Aug. 16, 1994, both of which are assigned to Intel Corporation, the assignee of the present invention.

TECHNICAL FIELD

The present invention relates to data processing systems and more particularly, to an apparatus for tracking processor cycles occurring in a controller for a data cache.

BACKGROUND ART

A cache is a relatively high-speed, small, local memory which is used to provide a local storage (a buffer store) for frequently accessed memory locations of a larger, relatively slow, main memory (a backing store). By storing the information or a copy of the information locally, the cache is able to intercept memory references and handle them directly without transferring the request to the main memory over a system bus. The result is lower traffic on the memory bus and decreased latency on the CPU bus to the requesting processor.

The above-referenced U.S. Pat. No. 5,210,845 discloses a cache controller having a tag random access memory (RAM) which is configured into two ways. Each way includes tag and valid-bit storage for associatively searching the directory for cache data-array addresses. The external cache memory is organized such that both ways are simultaneously available to a number of available memory modules in the system to thereby allow the way access time to occur in parallel with the tag lookup.

The above-referenced U.S. Pat. No. 5,339,399 discloses a method and means for managing complex timing cycles in the cache controller of U.S. Pat. No. 5,210,845. Output enable activation time is very critical to synchronizing the external cache with an Intel 80486 TM microprocessor operating at 33MHz. As soon as a cycle starts by presenting an address to the tag RAM, the time that the tag RAM needs in order to signal that the address is a hit or a miss is almost half into the next clock period. To manage this timing the U.S. Pat. No. 5,339,399 provides control logic that comprises a first address latch, a second address latch and a clocking means. The clocking means includes a first clock signal for capturing a current address on an input address bus into one of said first and second address latches at the beginning of a current cycle. The clocking means further includes a second clock signal for capturing a next address on the input address bus into the other one of said first and second address latches at the beginning of a next cycle, the other of said latches holding the current address until said current cycle ends. Means are provided for alternately selecting one of said first and second latches on successive cycles of said clocking means to receive an input address at the successive clock cycles. A multiplexer (MUX) controls which of said current address and said next address is gated to said tag RAM. A snoop cycle signal line is provided for signalling that a snoop address is on the address bus. A first snoop latch connected to the address bus and responsive to the snoop cycle signal line stores the snoop address. A second snoop latch connected to the first snoop latch address bus and responsive to a snoop cycle signal line is provided to further buffer the snoop address. A third clock signal is provided for capturing the contents of the first snoop latch into the second snoop latch to thereby extend the time that the snoop address is available at the input to the tag RAM. The MUX further includes means for controlling which of the current address and the next address and the snoop address is gated to the tag RAM.

Tracking the internal cycle of the cache controller described in the above-referenced applications could be a complicated task with many terms contributing to the equations. This would slow down the operation to such a degree that the cache controller would not be commercially practicable.

It is therefore an object of the present invention to provide a means for tracking processor cycles in a controller for a data cache that reduces the terms involved to thereby speed up the operation.

SUMMARY OF THE INVENTION

Briefly, the above object is accomplished in accordance with the invention by providing a data processing system in which a processor communicates over a central processing unit (CPU) bus with a main memory by asserting an address strobe (ADS) signal to initiate a memory access. Also provided is a cache controller including CPU bus control logic for controlling access to the CPU bus, and a tag random access memory (RAM). The cache controller includes a first logic in the tag RAM responsive to an external cycle (EXCYC) signal for asserting an internal cycle (INCYC) signal during a time when a request to the tag RAM is pending; a second logic for combining the INCYC signal with the ADS signal to generate an ADSWAIT signal; a third logic connected to the second logic for combining the ADSWAIT signal with the ADS signal to generate an address strobe cycle (ADSCYC) signal; a fourth logic responsive to one of a number of end-of-cycle signals for generating a terminate signal to signify an end of a current cycle; and a fifth logic connected to the third logic and to the fourth logic for asserting the EXCYC signal in response to the ADSCYC signal and for unasserting the EXCYC signal in response to the terminate signal.

The invention has the advantage that logic speeds up the processor cycle tracking operation.

BRIEF DESCRIPTION OF THE DRAWINGS

The invention will be apparent from the following more particular description of the preferred embodiment of the invention as illustrated in the accompanying drawings, wherein.

DESCRIPTION OF THE PREFERRED EMBODIMENT

Figure 1:
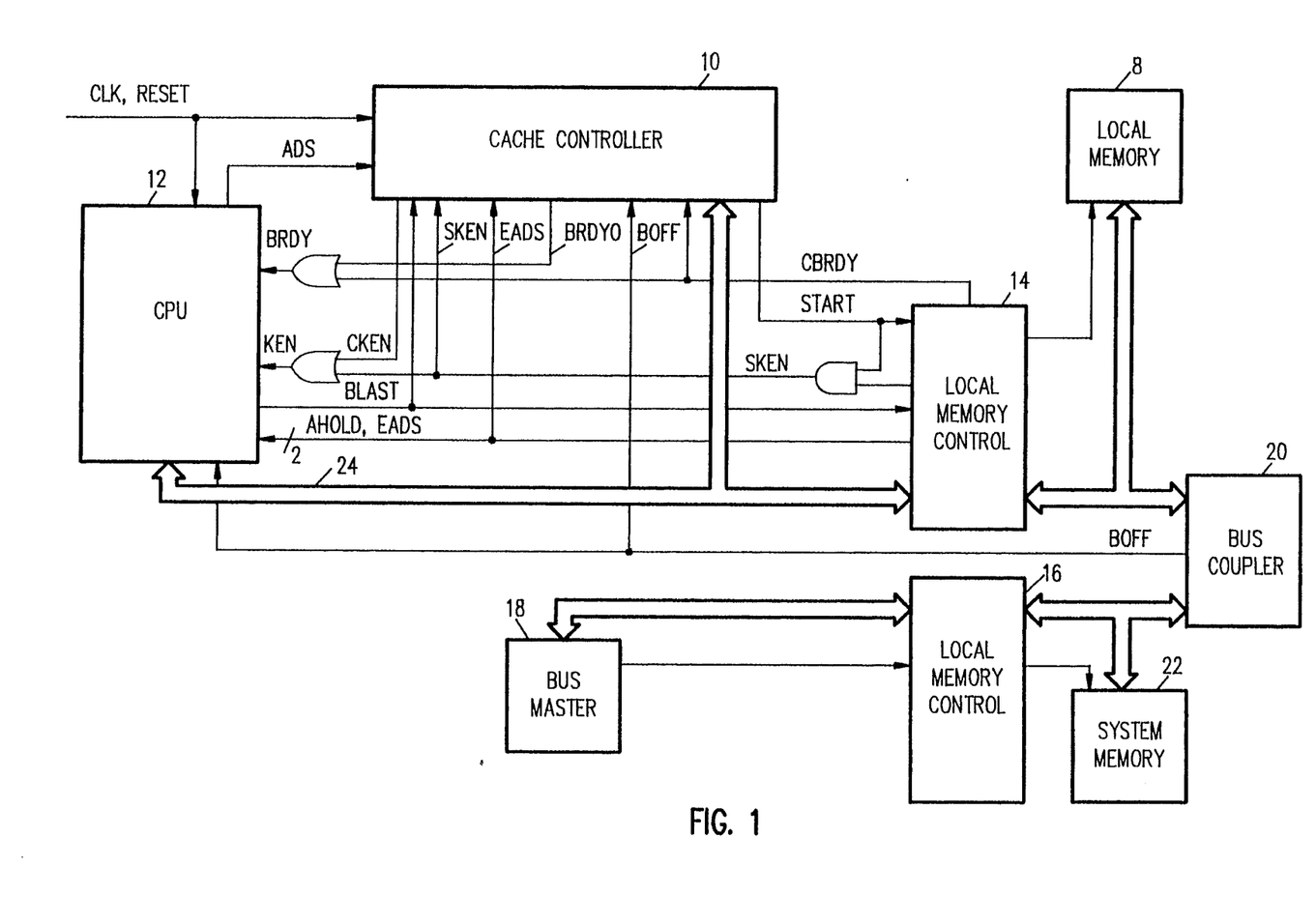
FIG. 1 is a block diagram of a data processing system in which the invention is embodied.

Refer now to FIG. 1 which is a block diagram of a data processing system in which the present invention is embodied. The data processing system is described more fully in U.S. Pat. No. 5,210,845. The cache controller (10) is a second level, single-ported, optional, add-on cache controller for a microprocessor CPU (12), such as the Intel 80486 TM. It monitors CPU address bus (14) activity to determine when it needs to search its internal tag RAM. The cache controller directly interfaces to the microprocessor via a processor interface.

The data cache or local memory (8) is external to the cache controller (10). The cache controller buffers the data cache's addresses in a snoop register and address register and supplies all other data cache control to support no wait state processor operation when there is a cache hit. The cache controller has provisions to support Snoop cycles, Back Off, and premature BLAST terminations. Internally, the cache controller maintains the TAG address and Status of each data cache line.

Signals for the cache controller (10) are more fully described in U.S. Pat. No. 5,210,845. They include: Control Signals: CLK, RESET, ADS#, M/IO#, W/R#, START#, BRDYO#, CBRDY#, CRDY#, BLAST#, BOFF#, and PRSN#, Address Signals: A2–A31, BE0#–BE3#, and CS#, Data Signals: D0–D31, DP0–DP3, Cacheability Signals: CKEN#, SKEN#, FLUSH#, WP, WPSTRP#, and EADS#.

External Signal Description

Signals are described below by name, followed by type of signal, input (I), output (O), or both (I/O), active high or low, and a brief description.

Control Signals

CLK I—CLOCK is the timing reference from which the cache controller monitors and generates events.

RESET I High RESET CACHE forces the cache controller to begin execution in a known state. It also causes all cache lines to be invalidated.

ADS# I Low ADDRESS STROBE is generated by the Microprocessor. It is used to determine that a new cycle has been started.

START# O Low MEMORY START indicates that a cache read miss or a write has occurred and that the current access must be serviced by the memory system. START# is not activated for I/O cycles, and is not asserted if CS# is inactive.

BRDYO# O Low BURST READY OUT is a burst ready signal driven by the cache controller to the CPU. It is activated when a read hit occurs to the cache controller and is a term in the BRDY# input to the CPU.

CBRDY# I Low CACHE BURST READY IN is the burst ready input from the memory system. It is applied to both the cache controller and the CPU BRDY# pin in parallel. CBRDY# is ignored during T1 and idle cycles. BLAST# determines the length of the transfer.

CRDY# I Low CACHE READY IN is the nonburst ready input from the system. Like CBRDY#, it is applied to both the cache and CPU RDY# pin in parallel. CRDY# is ignored during T1 and idle cycles.

BLAST# I Low BURST LAST is output by the CPU and is sampled by the cache controller to determine when the end of a cycle occurs.

BOFF# I Low BACKOFF is a CPU input sampled by the cache controller to indicate that a cycle be immediately terminated. If BOFF# is sampled active, the cache controller will float its data bus. The cache controller will ignore all cycles, except invalidation cycles, until BOFF# is deactivated.

Address Signals

A2–A31 I—PROCESSOR ADDRESS LINES A2–A31 are the CPU address lines used by the cache controller. Address lines A2 and A3 are used as burst address bits. In a 64 k cache controller, A4–A14 comprise the set address inputs to the cache controller and A15–A31 are used as the tag address. In a 128 k cache controller, A4 becomes a line select input, AS–A15 is the set address input and A16–A31 is used as the tag address.

Data Signals

D0–D31 I/O—PROCESSOR DATA LINES D0–D31 are connected to the CPU data bus. D0–D7 define the least significant byte while D24–D31 define the most significant byte.

Cacheability Signals

CKEN# O Low CACHE ENABLE TO CPU is the KEN# term generated by the cache controller to the Microprocessor. CKEN# is activated twice; First during T1 to enable a cache line fill, and second on the clock before the last BRDY# or RDY# to validate the line fill. CKEN# is ALWAYS active in T1, but will not validate a line fill if the line fill is a write protected line and WPSTRP# is low, or if the cycle is a read miss.

SKEN# I Low SYSTEM CACHE ENABLE is an input from the main memory system to indicate whether the current line fill is cacheable in the cache controller. It is sampled by the cache controller exactly like KEN# is sampled by the Microprocessor.

FLUSH# I Low FLUSH CACHE causes the cache controller to invalidate its entire cache contents regardless of CS#. Any line fill in progress will continue, but will be invalidated immediately.

Invalidate Signals

EADS# I Low VALID EXTERNAL ADDRESS STROBE indicates that an invalidation address is present on the CPU address bus. The cache controller will invalidate this address, if present, but will only do so if CS# is active. The cache controller is capable of accepting an EADS# every other clock. The cache controller EADS# should be connected to the CPU EADS# pin.

Logic Description

Figure 2:
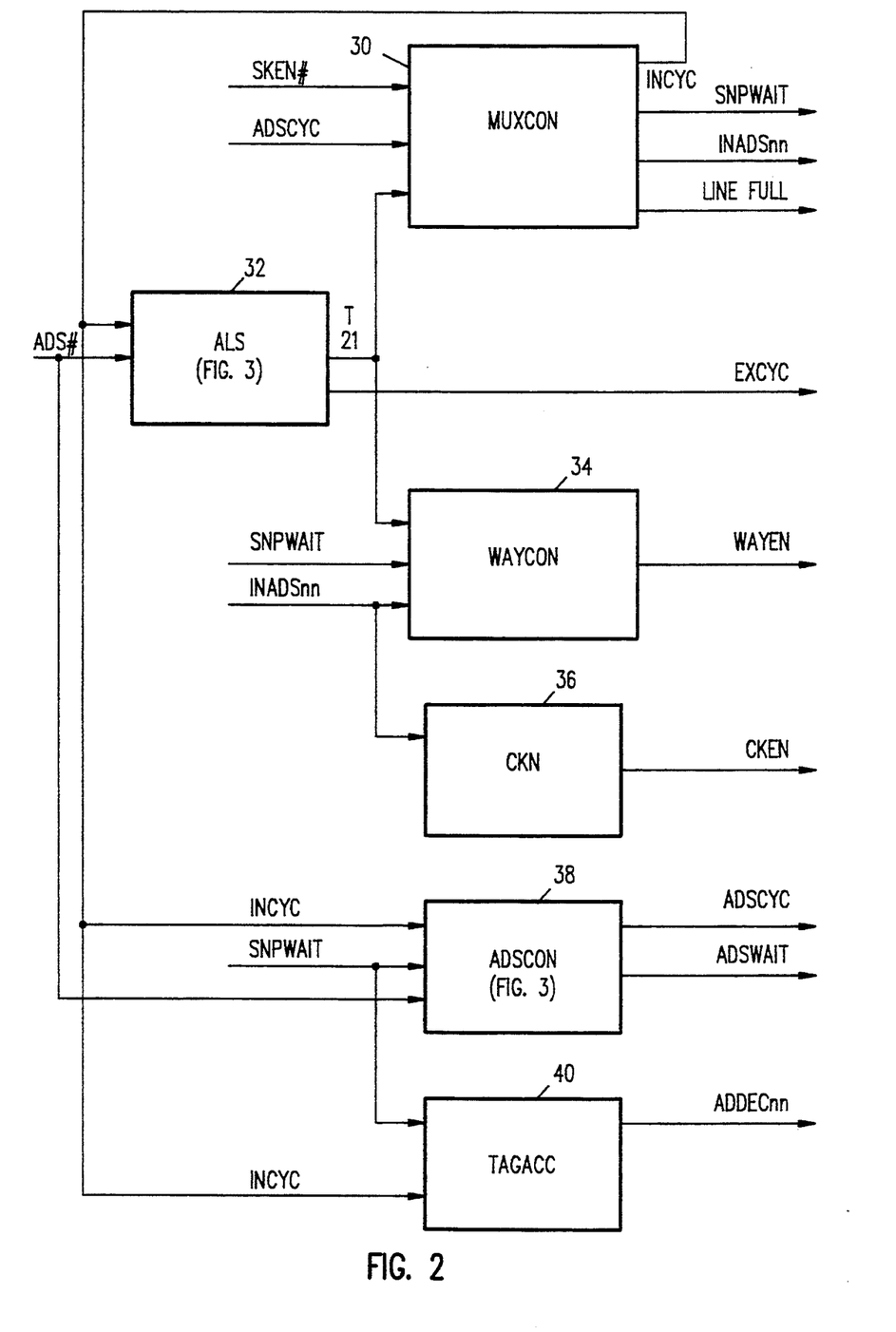
FIG. 2 is a diagram of logic within the cache controller (10) shown in FIG. 1.

FIG. 2 shows the internal structure of the cycle tracking logic which is within the cache controller (10) shown in FIG. 1. There are numerous signals interconnecting the various logic blocks some of which are described in the section entitled "Internal Signal Descriptions", and the remainder are described in U.S. Pat. No. 5,210,845.

Internal Signal Descriptions

Detailed descriptions of internal signals are given in U.S. Pat. No. 5,339,399, wherein it is explained that each internal signal name begins with a characteristic letter that identifies its generic source. The first character can be one of {r, t, x, y, z}. The remaining part of the signal name is in upper case letters. A signal ending in "nn" means it is a low-true signal. The corresponding notation for an external signal will have "#" instead. Also, brackets '{}' are used to describe signal names containing the substrings within the brackets. For example, rWR{STS, TAG, LRU} stands for rWRSTS, rWRTAG, and rWRLRU, respectively. When the substrings are one character in length, then a pair of brackets are used without separating the characters with a comma. For example, [yz]ADSnn means yADSnn and zADSnn. Brackets are also used to denote ranges. For example, zSAI{0-10} stands for zSAI0, zSAI1 . . . , zSAI10. When such multiple-bit signals are referred to, the range-specifier is deleted. For instance, the eleven zSAI[0-10] signals are denoted as zSAI.

Functional Description

Figure 4:
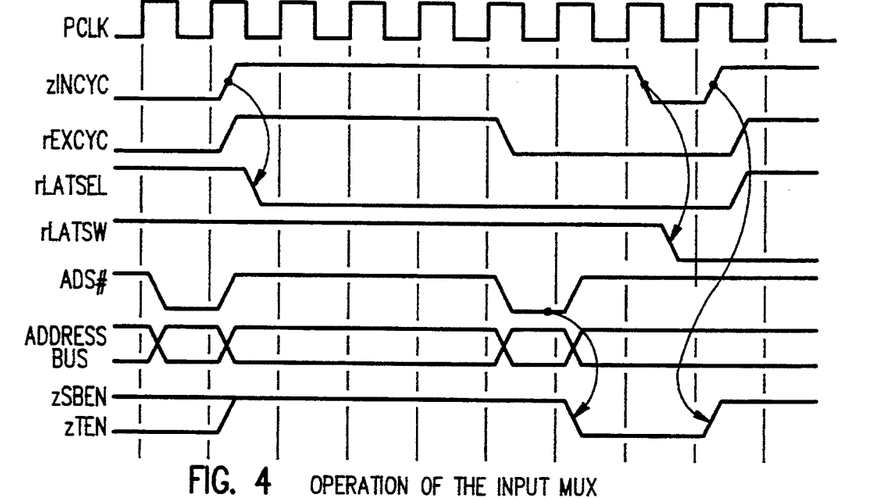
FIG. 4 is a timing diagram of the operation of the logic shown in FIG. 2.

Refer to FIG. 4. A cycle starts with zADSCYC. Under normal circumstances, zADSCYC follows yADSnn. However, if the logic is still in a cycle (zINCYC active), due to pending requests to the tag RAM, then yADSnn will trigger zADSWAIT which in turn will trigger zADSCYC as soon as the cycle ends (zINCYC inactive). Also, a snoop occurring while the bus is idle starts a cycle, in which case the cycle will last exactly two clocks.

A cycle ends when any of the following three conditions are met:
1. RESET
2. BLAST# with BRDY#, RDY# or BRDYO#
3. BOFF#

A cycle is tracked in two ways. The external cycle, the cycle as seen by an external driver, is tracked with rEXCYC. The internal cycle, the cycle as dictated by the tag RAM access, is tracked with zINCYC. As long as the chip is in an internal cycle, with zINCYC active, another external cycle will be kept pending.

Referring now to FIG. 2, as described more fullying in U.S. Pat. No. 5,339,399 at any time, except when the next cycle has started, but during which the current cycle is in progress, a latch is open to an input buffer, in the sense that at every SACLK, the input address is latched by that latch. Another latch holds the current cycle address until the cycle ends. rLATSEL selects the latch that will remain exposed to the input buffer. The reason for having two address latches is as follows. The current cycle can be extended with snoops. The current cycle address has to be maintained as long as the cycle is still in progress. In the meantime, the external cycle (monitored by rEXCYC), might have ended and a new one started. The second address latch is used to capture the address corresponding to this new cycle.

rLATSEL switches when the current cycle ends (when zINCYC becomes inactive). rLATSEL controls which of the two input latches will receive xSAI at the next SACLK. zLATSW indirectly selects which of the two latches will supply the address via a MUX to the tag RAM.

FIG. 4 shows the timing of various signals that control the input mux. In FIG. 4, rLATSEL toggles as the cycle starts, opening up the other latch to the input buffer. zLATSW continues to supply the tag RAM from the current latch. zLATSW will switch to the other latch as the cycle ends signalled by zINCYC going inactive. zSBEN and zTEN are control signals which decide if the latch selected by rLATSEL will receive the external address at the next SACLK. If the current cycle is still in progress, and the next cycle begins, then zSBEN and zTEN turn off the latch to which rLATSEL points until the logic reacts to the address ADS#.

zLATSW is used in conjunction with rLATSEL to switch the two input address latches so that the tag RAM sees a constant address for the duration of a cycle while at the same time a new cycle address can be received. zLATSW does not directly control the mux, but creates two signals, zSELTSL1 and zSELTSL2, which do.

zLS is the latched version of yLS. A two-latch muxing scheme similar to that described above is used to capture yLS. zLS selects the sector to operate on during snoops and normal cycles. All circuits make sure that when a snoop cycle asserts zLS, its state is properly restored after snoop processing is done.

During a line fill, the RLS (32) must know if the current line has been subjected to a snoop cycle before generating validation requests to the tag RAM. Match signals (zLSMATCH, zSMATCH, zTMATCH) are asserted when the corresponding address bits between the snoop and the cycle addresses match. The comparison is done between the contents of the cycle address latch selected by zLATSW and that of the first snoop latch.

zSAI[0-10] are the set address outputs of the input mux. The polarity of zSAI is opposite of xSAI. zLATSW selects which one of the two address latches will generate zSAI during normal cycles. During a snoop cycle, zSELSNP will select the snoop latch to generate zSAI. zSAO[0-10] provide load isolation for the set address inputs. zSAO are meant for the cache controller SRAMs only. The zSAO latch is enabled by rEXCYC so that the address outputs remain constant as long as the bus master is running a cycle. zSBEN serves as an additional enable signal so that if a new cycle starts while the current cycle is still in progress, the SAO latch does not lose the new cycle address due to AHOLD.

The zSELTSL1, zSELTSL2 signals select one of the two input address latches during a cycle. They are derived from zLATSW. During a snoop cycle, they get overridden by zSELSNP.

Figure 6:
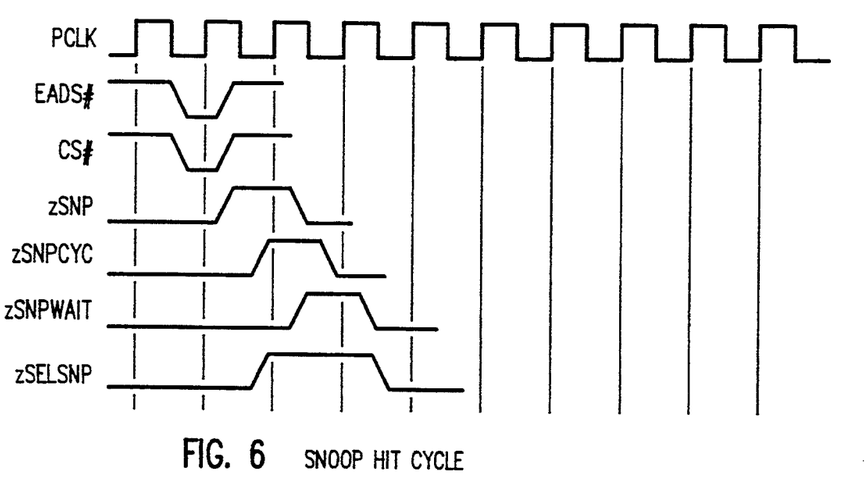

If a snoop is chip-selected, then zSNPCYC is generated in the following SACLK and lasts one full clock. It enables the input-address mux to let the snoop address through. zSNPCYC is also used to enable the snoop latches to capture the outputs from the tag RAM in the next SHCLK so that a hit or miss can be determined. In the RLS, zSNPCYC is used along with z(S,T,LS)MATCH to decide if the current line has been snooped out. zSNPCYC is also used to prevent the first snoop latch (218) from capturing the address bus a clock after EADS#, so that the snoop address can be maintained for a potential snoop invalidation. FIG. 6 shows the snoop cycle timing.

zTAI[0-16] are the tag address outputs of the TAG-MUX input mux. The polarity of zTAI is the opposite of xTAI. zLATSW selects which one of the two TAG-MUX address latches will generate zTAI during normal cycles. During snoop, zSELSNP will select the TAG-MUX snoop latch to generate zTAI.

EADS# is latched by PCLK to generate zSNP. If zCSnn is present simultaneously, then zSNPCYC is created and the snoop is processed. FIG. 6 shows the relationship between all snoop-related signals. A chip-selected zSNP automatically stretches the current cycle by two clocks from the clock at which the EADS# occurred. If EADS# happens during an idle bus, then it creates a two-clock cycle.

zSNPHR is a tag hit signal from the right side of the tag RAM that is captured at the first SHCLK after zSNPCYC as shown in FIG. 6. In conjunction with zSNPWAIT, it selects the way for snoop invalidalton.

If a snoop look-up yields a hit, then zSNPWAIT is generated at the sampling SHCLK in FIG. 6 and lasts for one full clock. It enables the tag RAM for one more clock so that the corresponding line can be invalidated.

In ADSCON (38), zSNPWAIT is used in a redundant fashion to delay the start of a new cycle in response to an ADS#. It is redundant because if there is a snoop zINCYC will last long enough to cover the zSNPWAIT time period, and if zINCYC is active, then the next ADS# will be delayed anyway if it occurs when zINCYC is active. In TAGACC, it generates zWRLRU and zWRSTS commands that carry out the invalidalton. In WAYCON (34), it creates zWAYSEL for proper way identification during the invalidalton.

Read Hit Cycle

A read hit cycle starts with zADSCYC and zRDSCYC. The tag look-up will yield a hit at the first SHCLK. BRDYO# will go active indicating a hit. Also the first output-enable (OE1) goes active. The first-enable is picked from the four possibilities using the burst address sequence. Since the cache controller is signaling the transfers at every clock with BRDYO#, the logic will advance through TO22, TO23, and TO24 at every clock. The appropriate enable is created for each transfer. If a BOFF# interrupts the transfer, then a request is made to the tag RAM to invalidate the line.

Read Miss Cycle

A read miss cycle starts with zADSCYC and zRDSCYC. The tag look-up will yield a miss at the first SHCLK. START# goes active indicating a miss. From then on, the logic will wait until SKEN# is active. If SKEN# is active before the first transfer, then the line is said to be committed. A line in the tag RAM is selected (zWAYSEL) using the zADSLRU, zADSHL and zADSHR signals.

Referring to FIG. 2, the period from when ADS# is recognized by the RLS (32) until the first transfer takes place is called $T_{21}$. The signal rT21, when active, signifies that the system is in the period $T_{21}$. MUXCON (30) uses the signal rT21 to determine if SKEN# should be sampled so that the current line-fill cycle can be committed. WAYCON (34) uses the signal rT21 to determine if the way selection mechanism should select the current write-enable, or should RLS do so using one of r[TB]WE[AB]nn signals.

Figure 3:
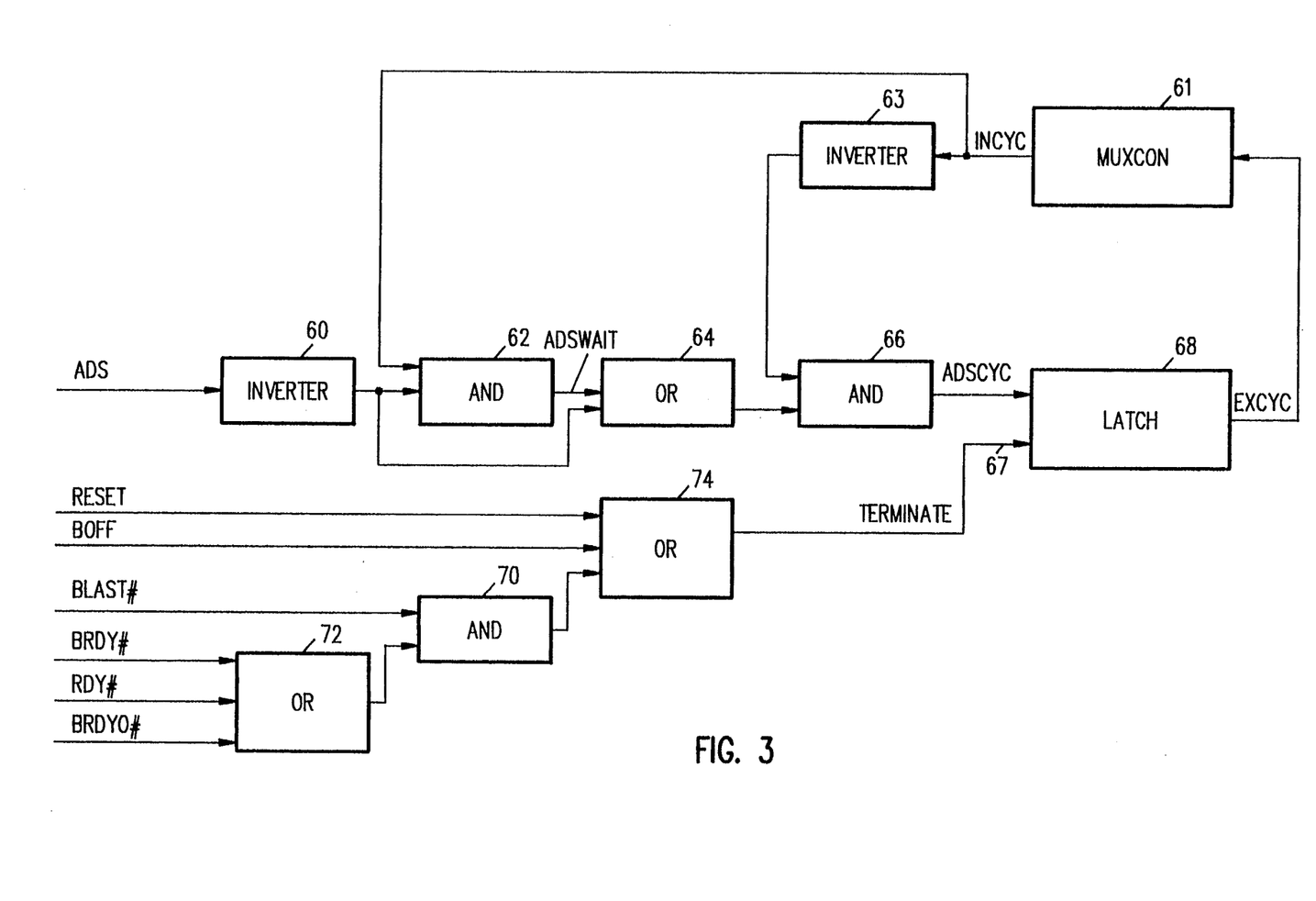
FIG. 3 is a diagram of logic within the RLS (32) and ADSCON (38) shown in FIG. 1.

Referring to FIG. 3, the signal zINCYC from the MUXCON logic (61) is active lo when a cycle is being processed by the system. It starts as soon as a cycle begins either with zADSCYC or zADSWAIT and continues on until a termination condition is reached signified by the assertion of the terminate signal (67). At termination, if there are requests to tag RAM pending, then zINCYC remains active until all requests have been satisfied.

Referring to FIG. 3, the ADSWAIT signal output from the AND circuit (62) is the INCYC signal anded with the output of inverter (60) which is the inversion of the ADS signal. The ASDCYC signal is produced by taking the output of the inverter (60) and ORing this with the ADSWAIT signal in OR (64). The output of OR (64) is then ANDed with the output of the inverter (63).

Figure 5:
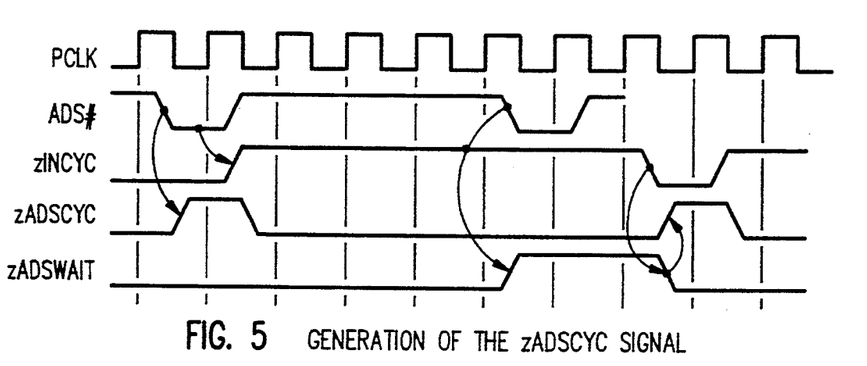
FIG. 5 is a timing diagram of the generation of the zADSCYC signal shown in FIG. 3; and, FIG. 6 is a timing diagram of the generation of a snoop hit cycle shown in FIG. 2.

There are two sources for tag RAM requests: RLS (rWR(STS,TAG,LRU)), and snoops (zSNPCYC, zSNPWAIT). zINCYC will remain active as long as the RLS write commands are active, provided there is no zSTSACK from TAGACC. FIG. 5 is a timing diagram that shows how zINCYC behaves. Snoops automatically extend zINCYC by two clocks from the clock at which EADS# occurs. This is described more fully in U.S. Pat. No. 5,339,359. If EADS# occurred during idle bus, zINCYC will be active for two clocks.

In the ADSCON logic (38), the zINCYC signal is used to decide if zADSCYC or zADSWAIT should be generated in response to a new ADS#. In the TAGACC logic (40), the zINCYC signal generates zADDECnn. In the RLS logic, the zINCYC signal is used to control all signals that are activated during a cycle.

The zINADSnn signal is exactly the same as the zINCYC signal except that snoop does not extend zINADSnn, as it does zINCYC. In CKN, the zINADSnn signal is combined with rCKENnn to generate xCKENnn. When zINADSnn is inactive, xCKENnn is forced active. In WAYCON (34), the zINADSnn signal is used to create zWAYEN.

The zLATSW signal is used in conjunction with rLATSEL to switch the two input address latches so that the tag RAM sees a constant address for the duration of a cycle and at the same time a new cycle address can be received. This is described more fully in copending U.S. Pat. No. 5,339,399. zLATSW does not directly control the mux. It creates two signals, zSELTSL1 and zSELTSL2, which do.

The rEXCYC signal keeps track of when the external system starts and ends its cycle. rEXCYC starts when the system recognizes the ADS# signal, as signified by zADSCYC, and ends when the terminate signal becomes true.

If a snoop look-up yields a hit, then the zSNPWAIT signal is generated at the sampling SHCLK as shown in FIG. 6, and lasts for one full clock. It enables the tag RAM for one more clock so that the corresponding line can be invalidated. In the ADSCON logic, zSNPWAIT is used in a redundant fashion to delay the start of a new cycle in response to an ADS# signal. The zSNPWAIT signal is redundant because if there is a snoop, zINCYC will last long enough to cover the zSNPWAIT time period, and if zINCYC is active, then the next ADS# will be delayed anyway if it occurs when zINCYC is active. In the TAGACC logic, the zSNPWAIT signal generates zWRLRU and zWRSTS commands that carry out the invalidation. In the WAYCON logic, the zSNPWAIT signal creates the zWAYSEL signal for proper way identification during the invalidation.

The rLATSEL signal switches when the current cycle ends and the zINCYC signal becomes inactive. The rLATSEL signal controls which of the two input latches will receive the address signal xSAI at the next SACLK. zLATSW indirectly selects which of the two latches will supply the address to the tag RAM.

The tag RAM will do a look-up only when the zAD-DECnn signal is active. When a cycle is in progress, zADDECnn is active. During idle bus cycles, it will remain inactive. The tag RAM will do a look-up whenever yADSF, zADSWAIT, or zINCYC is active, provided the zBOFFnn signal is inactive.

When active, the zADSCS signal means that a current cycle has been chip-selected. In the RLS logic the zADSCS signal controls most of the r signals. In the TAGIFC logic, the zADSCS signal controls the enable signal to the ADS latches which capture the tag RAM outputs at the beginning of a cycle. All other circuits sample yCSnn or zCSnn directly.

No Cycle in Progress

In FIG. 5, the zADSCYC signal signifies the start of a bus cycle. The zADSCYC signal is triggered by the ADS# signal when there is no cycle in progress (zADSWAIT is not asserted).

Cycle in Progress

In FIG. 5, if a cycle is in progress, then zINCYC is asserted from the MUXCON logic block, which causes zADSWAIT to be asserted. zADSWAIT being asserted blocks the start of a new cycle. When the ADS# signal for the next cycle arrives, it is ANDed with zADSWAIT which blocks the generation of zADSCYC. zADSWAIT will last for as long as zINCYC is still active. When the current cycle ends, zINCYC is unasserted, causing zADSWAIT to be unasserted which activates zADSCYC to start the new cycle. zADSCYC does not respond to I/O cycles. It lasts for one full SACLK.

While the invention has been particularly shown and described with reference to preferred embodiments thereof, it will be understood by those skilled in the art that the foregoing and other changes in form and detail may be made therein without departing from the scope of the invention.

What is claimed is:

1. In a data processing system-in which a processor (12) communicates over a central processing unit bus (CPU bus) with a main memory (22) by asserting an address strobe (ADS) signal to initiate a memory access and asserts a number of end-of-cycle signals to end a memory access, a cache controller (10) including CPU bus control logic (28) for controlling access to said CPU bus, and a tag random access memory (tag RAM); a cache data-array (8) connected to said cache controller (10) and to said CPU bus; a combination comprising:

an external cycle (EXCYC) signal line:
an internal cycle (INCYC) signal line;
an address strobe wait (ADSWAIT) signal line;
an address strobe cycle (ADSCYC) signal line;
first means in said tag RAM responsive to an external cycle (EXCYC) signal on said external cycle (EXCYC) signal line for asserting an internal cycle (INCYC) signal on said internal cycle (INCYC) signal line during a time when a request to said tag RAM is pending;
second means connected to said first means for ANDing said INCYC signal line and said ADS signal line to generate an address strobe wait (ADSWAIT) signal on said address strobe wait (ADSWAIT) signal line;
third means connected to said second means for ORing said ADSWAIT signal line and said address Strobe (ADS) signal line to generate an address strobe cycle (ADSCYC) signal on said address strobe cycle (ADSCYC) signal line;
fourth means responsive to one of said number of end-of-cycle signals for generating a terminate signal to signify an end of a current cycle; and,
fifth means connected to said first means, to said third means and to said fourth means for asserting said EXCYC signal in response to said ADSCYC signal and for unasserting said EXCYC signal in response to said terminate signal.

2. The data processing system in accordance with claim 1 wherein said number of end-of-cycle signals includes a RESET signal line and a back off (BOFF) signal line, said fifth means further comprising:

a latch connected to said address strobe cycle (ADSCYC) signal line, to said RESET line, and to said BOFF signal line, said latch being set by said address strobe cycle (ADSCYC) signal on said address strobe cycle (ADSCYC) signal line and is reset by a RESET signal on said RESET signal line and alternatively is reset by a BOFF signal on said BOFF signal line.

\* \* \* \* \*

UNITED STATES PATENT AND TRADEMARK OFFICE
CERTIFICATE OF CORRECTION

PATENT NO. : 5,392,417
DATED : February 21, 1995
INVENTOR(S) : Iyengar, et al.

It is certified that error appears in the above-indentified patent and that said Letters Patent is hereby corrected as shown below:

Column 7, line 63, change "active lo" to --active --

Signed and Sealed this

Ninth Day of April, 1996

Attest:

BRUCE LEHMAN

Attesting Officer

Commissioner of Patents and Trademarks